Patented Jan. 19, 1937

2,068,047

UNITED STATES PATENT OFFICE 2,068,047

THIO- AND SELENO-CARBOCYANINES

Walter Zeh, Dessau in Anhalt, Adolf Sieglitz, Frankfort-on-the-Main-Sindlingen, and Martin Dabelow, Frankfort-on-the-Main-Hochst, Germany, assignors to Agfa Ansco Corporation, Binghamton, N. Y., a corporation of New York No Drawing. Application April 24, 1933, Serial No. 667,712. In Germany April 26, 1932

5 Claims. (Cl. 260—44)

Our present invention relates to sensitizing of photographic emulsions.

One of its objects is the manufacture of carbocyanine dyes. Further objects will be seen from the detailed specification following hereafter.

It is already known to sensitize silver halide emulsions by means of carbocyanines which are substituted in the benzene nucleus. These dyes when suitably selecting the substituents distinguish over the non-substituted dyes by an increased sensitizing power.

This invention is based on the discovery that the disubstitution products of the carbocyanines of which 5,6-position of the benzene nucleus is occupied by equal or dissimilar substituents have a sensitizing action on photographic silver halide emulsions far superior to all otherwise substituted dyestuffs. It has been proved that these dyes substituted in the 5 and 6 position and/or 5' and 6' position are superior with regard to their sensitizing action to those substituted, for instance, in the 5 or 6 and the 5' or 6' position or to the disubstituted dyes when containing the substituents in other positions of the benzene nucleus or even to trisubstituted dyes.

The dyestuffs suitable for the present process are derived from the following formulae:

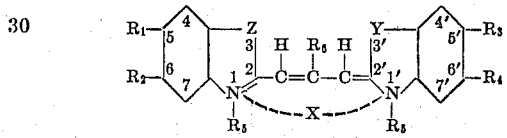

Y and Z stand for O, S, Se, or

wherein

R' and R'' may be alkyl or aryl,
$R_1$, $R_2$, $R_3$ and $R_4$ stand for alkyl, alkoxy, thioalkyl, selenoalkyl, aryl or oxaryl,
$R_5$ stands for alkyl,
$R_6$ stands for hydrogen, alkyl, aryl, aralkyl or thienyl, and
X stands for Cl, Br, I, $SO_4CH_3$, $ClO_4$ or another acid radical

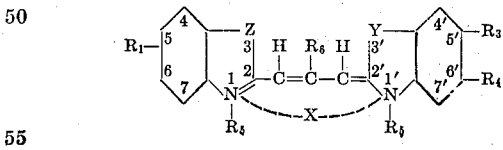

Y and Z stand for O, S, Se, or

wherein

R' and R'' may be alkyl or aryl,
$R_1$, $R_3$ and $R_4$ stand for alkyl, alkoxy, thioalkyl, selenoalkyl, aryl or oxaryl ($R_3$ and $R_4$ may be bound in 5',6'- or 5,6-position)
$R_5$ stands for alkyl,
$R_6$ stands for hydrogen, alkyl, aryl, aralkyl or thienyl, and
X stands for Cl, Br, I, $SO_4CH_3$, $ClO_4$ or another acid radical

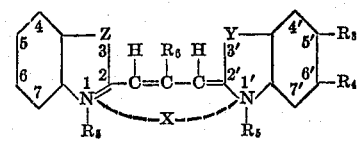

Y and Z stand for O, S, Se, or

wherein

R' and R'' may be alkyl or aryl,
$R_3$ and $R_4$ stand for alkyl, alkoxy, thioalkyl, selenoalkyl, aryl or oxaryl ($R_3$ and $R_4$ may be bound in 5',6'- or 5,6-position)
$R_5$ stands for alkyl,
$R_6$ stands for hydrogen, alkyl, aryl, aralkyl or thienyl, and
X stands for Cl, Br, I, $SO_4CH_3$, $ClO_4$ or another acid radical.

Furthermore the hydrogen atoms of the lateral members of the polymethine chains may be substituted by similar or dissimilar alkyl groups.

Instead of two alkoxy groups for the substitution of carbocyanines in 5- and 6-position, there may be used a dioxymethylene group or a dioxyethylene group; in the same way two oxyaryl groups may be replaced by a dioxyphenylene group.

The dyes are obtainable according to the desired solubility in form of the bromide, iodide, perchlorate etc., and are used for sensitizing photographic silver halide emulsion layers in a quantity as usual for the known sensitizing dyes. This quantity amounts to about 10 to 30 millirams per 1 kg. of emulsion ready for being cast which contains about 9 per cent of gelatin, 4.5 per cent of silver-halide, the rest being water. However, I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast.

The dyes may likewise be added by bathing the finished photographic material in a bath in which the dye is dissolved. Such a treatment may be as follows: The photographic material to be sensitized is bathed in a solution containing 1 milligram of the dye, for instance, 1,1'-diethyl-5,6-5',6'-tetramethoxybenzthiocarbocyanine bromide in 100 cc. of an aqueous solution of methanol of 50 per cent strength for about 5 minutes. The material is then dried, whereupon it is ready for use.

The preparation of the dyes and the bases from which the dyes are prepared is analogous to known methods.

1. The preparation of 5,6-dimethoxy-2-methylbenzothiazole is described by Fries in "Annalen der Chemie", vol. 468, 1929, pages 170 and 171.

2. The bases 5,6-diethoxy-2-methylbenzthiazole and 5,6-methylenedioxy-2-methylbenzthiazole are prepared according to the same method by starting from the corresponding amines.

3. The base 2,5,6-trimethylbenzothiazole is prepared analogous to known methods in the following way:
   (a) 4-amino-1,2-xylene + potassium rhodanate = 3,4-dimethylphenythiourea
   (b) The thiourea is transformed into 2-amino-5,6-dimethylbenzothiazole by means of sulfurylchloride
   (c) The aminothiazole is made into 1-amino-2-mercapto-4,5-dimethylbenzene by means of potassium hydroxide under pressure
   (d) The aminomercaptane yields the 2,5,6-trimethylbenzothiazole when treated with acetic anhydride.

4. The preparation of 2-methyl-5-methoxy-6-meth-thiobenzothiazole is as follows:
   (a) By the reaction on 1-chloro-2-methoxy-4-nitrobenzene with sodium disulfide the di(2-methoxy-4-nitro-phenyl)-disulfide is formed
   (b) The disulfide is dissolved in sodium hydrosulfide and methylated by means of dimethylsulfate. There is obtained 1-meth-thio-2-methoxy-4-nitrobenzene
   (c) The nitro product is reduced to 1-meth-thio-2-methoxy-4-amino benzene
   (d) The amino compound is made into the thiazole according to the method described by Fries above referred to.

5. The 2,6-dimethyl-5-ethoxybenzothiazole and 2,5-dimethyl-6-ethoxybenzothiazole are obtainable according to the method disclosed by Fries above referred to from 3-ethoxy-4-methyl-1-aminobenzene and 3-methyl-4-ethoxy-1-aminobenzene respectively.

The preparation of the seleno-azole bases is effected according to the method disclosed in "Berichte der Deutschen Chemischen Gesellschaft", vol. 46, 1913, pages 92 to 97, by starting from 4,5 disubstituted o-nitranilines corresponding with the general formula—

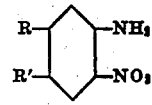

The following examples serve to illustrate our invention:

*Example 1.*—The dye 1,1'-diethyl-5,6-5',6'-tetramethoxybenzothiocarbocyanine iodide corresponding with the formula—

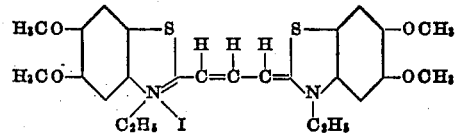

may be obtained by heating 10 grams of 2-methyl-5,6-dimethoxybenzothiazole and 10 grams of p-toluene sulfonic acid ethyl ester for 3 hours to 130° C. After cooling the mixture 100 cc. of dry pyridine and 15 grams of triethyl-o-formate are added and the mixture is heated for 2 hours under reflux. After removing the pyridine by distillation in the vacuum the residue is dissolved in 250 cc. of alcohol and to the solution there is added a concentrated aqueous solution of 4.1 grams of potassium iodide. The dye crystallizes in form of green rods and is recrystallized from alcohol.

The alcoholic solution of the dye has an absorption maximum at a wave length of about 595 $\mu\mu$.

Incorporated in a gelatino silver bromide emulsion containing about 4 per cent of silver iodide, the dye imparts to it a range of sensitiveness from about 500 $\mu\mu$ to 710 $\mu\mu$ with a maximum at about 625 $\mu\mu$.

*Example 2.*—The dye 1,1'-diethyl-5,6-5',6'-tetraethoxybenzothiocarbocyanine iodide corresponding with the formula—

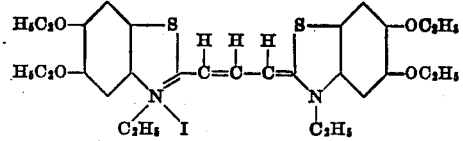

may be obtained by heating 12 grams of 2-methyl-5,6-diethoxybenzothiazole with 10 grams of p-toluene sulfonic acid ethyl-ester for 3 hours to 130° C. After cooling there are added 120 cc. of dry pyridine and 15 grams of triethyl o-formate and the mixture is boiled for 2 hours under reflux. The further working up of the dye is as described in Example 1. The dye crystallizes from alcohol in form of green rods.

The alcoholic solution of the dye has an absorption maximum at a wave length of about 600 $\mu\mu$.

Incorporated in a gelatino silver bromide emulsion containing about 4 per cent of silver iodide, the dye imparts to it a range of sensitiveness from about 500 $\mu\mu$ to about 710 $\mu\mu$ with a maximum at about 630 $\mu\mu$ which is flat.

*Example 3.*—The dye 1,1'-diethyl-5,6-5',6'-bis-methylenedioxybenzothiocarbocyanine bromide corresponding with the formula—

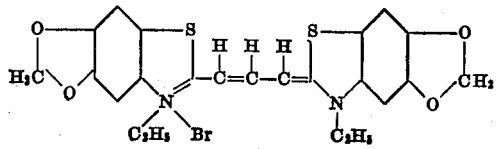

may be obtained by heating 9.6 grams of 2-methyl-5,6-methylenedioxybenzothiazole with 10 grams of p-toluene sulfonic acid ethylester for about 3 hours to 130° C. After cooling there are added 120 cc. of dry pyridine and 15 grams of triethyl o-formate whereupon the mixture is boiled for about 2 hours under reflux. The further working up of the dye is as described in Example 1. The dye crystallizes from alcohol green rhombic crystals.

The alcoholic solution of the dye has an absorption maximum at a wave length of about 595 μμ.

Incorporated in a gelatino silver bromide emulsion containing about 4 per cent of silver iodide, the dye imparts to it a range of sensitiveness from about 500 μμ to 710 μμ with a maximum at about 640 μμ.

Example 4.—The dye 1,1'-diethyl-5,6-5',6'-tetramethyl-benzothio-mesomethyl-carbocyanine iodide corresponding with the formula—

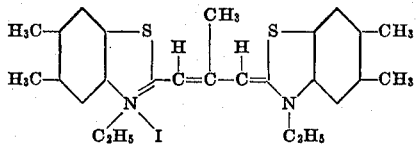

is obtained by heating 8.8 grams of 2,5,6-trimethylbenzothiazole and 10 grams of p-toluene sulfonic acid ethylester for 3 hours to 140° C. After cooling there are added 15 grams of triethyl o-acetate and 120 cc. of dry pyridine and the mixture is boiled for 2 hours under reflux. Then the pyridine is removed by distillation in the vacuum, the residue is dissolved in 250 cc. of alcohol and to this solution there is added a concentrated aqueous solution of 4.1 grams of potassium iodide. The dye which crystallizes is recrystallized from anhydrous alcohol and is then obtained in form of green tetrahedral crystals.

The alcoholic solution of the dye has an absorption maximum at a wave length of about 555 μμ.

Incorporated in a gelatino silver bromide emulsion containing about 4 per cent of silver iodide, the dye imparts to it a range of sensitiveness from about 500 μμ to 680 μμ with a maximum at about 600 μμ which is very flat.

Example 5.—The dye 1,1'-diethyl-5,6-5',6'-tetramethoxy-benzothio-mesoethyl-carbocyanine iodide corresponding with the formula—

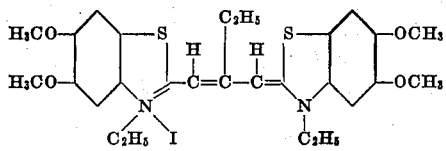

is obtained when working as described in Example 1 but using triethyl o-propionate instead of triethyl o-formate. The dye crystallizes from alcohol in form of green massive plates.

The alcoholic solution of the dye has an absorption maximum at a wave length of about 585 μμ.

Incorporated in a gelatino silver bromide emulsion containing about 4 per cent of silver iodide, the dye imparts to it a range of sensitiveness from about 490 μμ to 690 μμ with a maximum at about 600 μμ which is very flat.

Example 6.—The dye 1,1'-diethyl-5,6-5',6'-tetra-ethoxy-benzothio-mesomethyl-carbocyanine iodide corresponding with the formula—

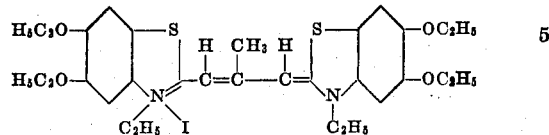

is obtained when working as described in Example 2, but using triethyl o-acetate instead of triethyl o-formate. The dye crystallizes from alcohol in form of bluish violet rods.

The alcoholic solution of the dye has an absorption maximum at a wave length of about 585 μμ.

Incorporated in a gelatino silver bromide emulsion containing about 4 per cent of silver iodide, the dye imparts to it a range of sensitiveness from about 490 μμ to 690 μμ with a maximum at about 605 μμ which is very flat.

Example 7.—The dye 1,1'-diethyl-5,6-5',6'-tetramethoxybenzoselenocarbocyanine iodide corresponding with the formula—

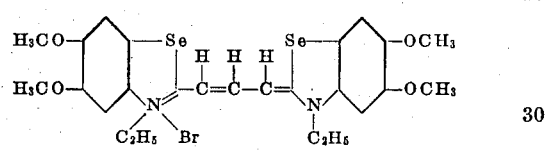

is obtained by heating 5 grams of 2-methyl-5,6-dimethylbenzoselenazole diethylsulfate (prepared by heating 10 grams of 2-methyl-5,6-dimethoxy-benzoselenazole with 6 cc. of diethylsulfate for 3 hours to 100° C. and purifying the reaction product by washing with acetone) 10 cc. of pyridine and 5 grams of triethyl o-formate for about 1 hour to 130° C. On the addition of about 30 cc. of an aqueous solution of potassium bromide of 10 per cent strength the dye separates in form of blue flakes. Recrystallization from alcohol yields greenish blue felted needles.

The alcoholic solution of the dye has an absorption maximum at a wave length of about 610 μμ.

Incorporated in a gelatino silver bromide emulsion containing about 4 per cent of silver iodide, the dye imparts to it a range of sensitiveness from about 500 μμ to 730 μμ with a maximum at about 650 μμ.

Example 8.—The dye 1,1'-diethyl-5,6-5',6'-tetraethoxybenzoselenocarbocyanine bromide corresponding with the formula—

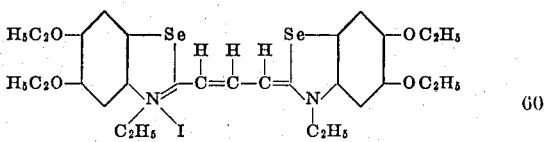

is obtained when working according to Example 7, but starting from 2-methyl-5,6-diethoxybenzoselenazole diethylsulfate. The dye crystallizes from alcohol in form of blue little rods.

The alcoholic solution of the dye has an absorption maximum at a wave length of about 610 μμ.

Incorporated in a gelatino silver bromide emulsion containing about 4 per cent of silver iodide, the dye imparts to it a range of sensitiveness from about 500 μμ to 730 μμ with a maximum at about 650 μμ.

*Example 9.*—The dye 1,1'-diethyl-5,6-5',6'-bis-ethylenedioxybenzoselenocarbocyanine iodide corresponding with the formula—

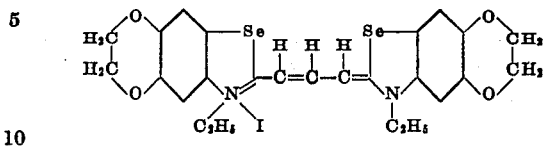

is obtained when condensing 2-methyl-5,6-ethylenedioxybenzoselenazole diethylsulfate with triethyl o-formate and precipitating the dye with an aqueous solution of potassium iodide of 10 per cent strength as described in Example 7. The dye crystallizes from alcohol in form of greenish blue felted little rods.

The alcoholic solution of the dye has an absorption maximum at a wave length of about 610 $\mu\mu$.

Incorporated in a gelatino silver bromide emulsion containing about 4 per cent of silver iodide, the dye imparts to it a range of sensitiveness from about 500 $\mu\mu$ to 730 $\mu\mu$ with a maximum at about 650 $\mu\mu$.

*Example 10.*—The dye 1,1'-diethyl-5,6-5',6'-bisethylenedioxybenzoseleno-mesoethyl-carbocyanine bromide corresponding with the formula—

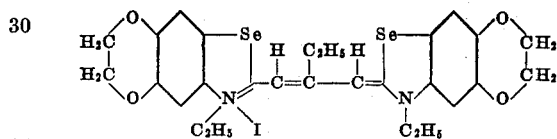

is obtained when working according to Example 9, but using triethyl o-propionate instead of triethyl o-formate.

The alcoholic solution of the dye has an absorption maximum at a wave length of about 590 $\mu\mu$.

Incorporated in a gelatino silver bromide emulsion containing about 4 per cent of silver iodide, the dye imparts to it a range of sensitiveness from about 490 $\mu\mu$ to 710 $\mu\mu$ with a maximum at about 620 $\mu\mu$.

*Example 11.*—The dye 1,1'-diethyl-5,6-5',6'-tetramethoxybenzoseleno-mesoethyl-carbocyanine perchlorate corresponding with the formula—

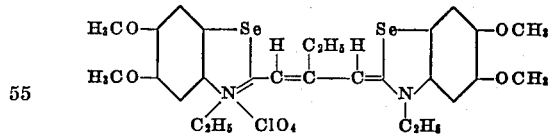

is obtained by boiling 5 grams of 2-methyl-5,6-diethoxybenzoselenazole diethylsulfate and 5 grams of triethyl o-propionate in 10 cc. of dry pyridine under reflux for about 1 hour. On the addition of 30 cc. of an aqueous solution of sodium perchlorate of 10 per cent strength the dye separates. Recrystallization from alcohol yields blue needles.

The alcoholic solution of the dye has an absorption maximum at a wave length of about 595 $\mu\mu$.

Incorporated in a gelatino silver bromide emulsion containing about 4 per cent of silver iodide, the dye imparts to it a range of sensitiveness from about 490 $\mu\mu$ to 710 $\mu\mu$ with a maximum at about 610 $\mu\mu$.

*Example 12.*—The dye 1,1'-diethyl-5,6-5',6'-tetramethylbenzothio-mesoethyl-carbocyanine iodide corresponding with the formula—

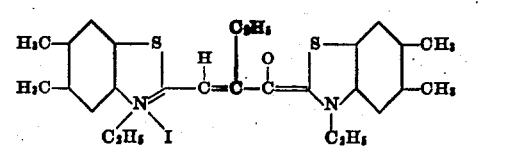

is obtained when working as described in Example 4 and replacing the triethyl o-acetate by triethyl o-proprionate. The dye crystallizes from alcohol in form of bluish green little rods.

The alcoholic solution of the dye has an absorption maximum at a wave length of about 562 $\mu\mu$.

Incorporated in a gelatino silver bromide emulsion containing about 4 per cent of silver iodide, the dye imparts to it a range of sensitiveness from about 500 $\mu\mu$ to 650 $\mu\mu$ with a maximum at about 600 $\mu\mu$.

*Example 13.*—The dye 1,1'-diethyl-5,5'-dimethoxy-6,6'-diphenylbenzothiocarbocyanine bromide corresponding with the formula—

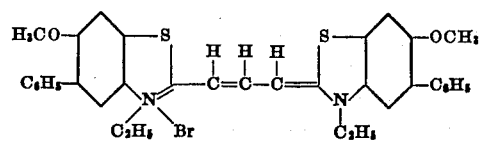

is obtained by heating 12.7 grams of 2-methyl-5-phenyl-6-methoxybenzothiazole with 10 grams of p-toluene sulfonic acid ethylester for 3 hours to 130° C. and condensing the reaction product with 15 grams of triethyl o-formate in 120 cc. of pyridine and further working up the product in the manner described in Example 1 with exception that the dye is precipitated by means of about 20 cc. of an aqueous solution of potassium bromide of 20 per cent strength. The dye crystallizes from alcohol in form of green little rods.

The alcoholic solution of the dye has an absorption maximum at a wave length of about 585 $\mu\mu$.

Incorporated in a gelatino silver bromide emulsion containing about 4 per cent of silver iodide, the dye imparts to it a range of sensitiveness from about 500 $\mu\mu$ to 700 $\mu\mu$ with a maximum at about 620 $\mu\mu$.

*Example 14.*—The dye 1,1'-diethyl-5,5'-dimeththio-6,6'-dimethoxybenzthiocarbocyanine bromide corresponding with the formula—

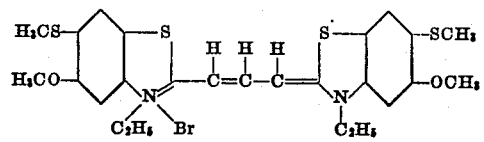

is obtained when working according to Example 12, but starting from 11.7 grams of 2-methyl-5-methoxy-6-meth-thiobenzothiazole and 10 grams of p-toluene sulfonic acid ethylester. The dye crystallizes from alcohol in form of bluish green felted needles.

The alcoholic solution of the dye has an absorption maximum at a wave length of about 610 $\mu\mu$.

Incorporated in a gelatino silver bromide emulsion containing about 4 per cent of silver iodide, the dye imparts to it a range of sensitiveness from about 510 $\mu\mu$ to 720 $\mu\mu$ with a maximum at about 640 $\mu\mu$ which is very flat.

*Example 15.*—The dye 1,1'-dimethyl-3,3,5-3',3',5'-hexamethyl-6,6'-dichloro-indocarbocyanine chloride corresponding with the formula—

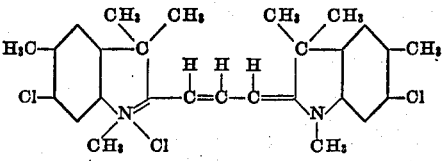

is obtained when working in the manner described in the example of U. S. Patent 1,524,791 and starting from 1,3,3,5,-methyl-6-chloro-2-methylene-indoline.

The alcoholic solution of the dye has an absorption maximum at a wave length of about 560 μμ.

Incorporated in a gelatino silver bromide emulsion containing about 4 per cent of silver iodide, the dye imparts to it a range of sensitiveness of about 500 μμ to 630 μμ with a maximum at about 590 μμ.

*Example 16.*—The dye 1,1'-diethyl-benzoseleno-5',6'-dimethylbenzothio-mesoethyl-carbocyanine iodide corresponding with the formula—

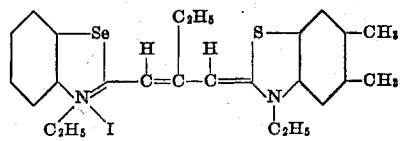

is obtained as follows:

(a) 10 grams of 2-methylbenzoselenazole ethiodide and 9 cc. of ethylisothiopropionanalide are heated to about 165 to 170° C. for about 1¼ hours while repeatedly stirring. There is produced a homogneous melt of dark color which is dissolved in 15 cc. of alcohol. This solution is mixed with about 20 cc. of ether while stirring. The intermediate product which crystallizes is filtered and recrystallized from alcohol.

(b) 5 grams of this intermediate product, 5 grams of 2,5,6-trimethylbenzothiazole ethiodide and 10 cc. of pyridine are boiled for about 1½ hours to 130 to 140° C. so that finally there is evaporated about half of the pyridine quantity employed. Hereafter there are added to reaction mixture a few cc. of an aqueous solution of potassium iodide of 10 per cent strength and a small amount of water. After cooling the dye separates. The dye may be purified by recrystallization from alcohol.

The alcoholic solution of the dye has an absorption maximum at a wave length of about 565 μμ.

Incorporated in a gelatino silver bromide emulsion containing about 4 per cent of silver iodide, the dye imparts to it a range of sensitiveness of about 500 μμ to 700 μμ with a maximum at about 650 μμ.

*Example 17.*—The dye 1,1'-diethyl-benzothio-5',6'-dimethylbenzothio-mesomethyl-carbocyanine iodide corresponding with the formula—

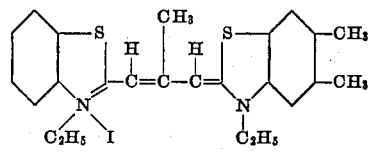

is obtained as follows:

(a) A mixture of 10 grams of 2-methylbenzothiazole ethiodide 7 grams of ethylisothio-acetanalide and 25 cc, of acetic anhydride are boiled for about 4 hours under reflux. After cooling and the addition of much ether a thickly liquid brown mass separates. The ether is decanted and the mass is further washed two times with ether by decanting. The residue is dissolved in about 12 cc. of alcohol at a temperature of about 50 to 60° C. After cooling the intermediate product corresponding probably with the formula—

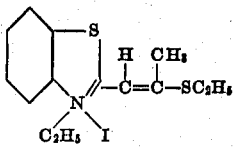

separates in form of crystals.

(b) 3 grams of this intermediate product, 3 grams of 2,5,6-trimethylbenzothiazole ethiodide and 12 cc. of pyridine are boiled for 1¼ hours. The dye is precipitated by the addition of a few cc. of an aqueous solution of potassium iodide of 10 per cent strength and is recrystallized from alcohol.

The alcoholic solution of the dye has an absorption maximum at a wave length of about 555 μμ.

Incorporated in a gelatino silver bromide emulsion containing about 4 per cent of silver iodide, the dye imparts to it a range of sensitiveness of about 500 μμ to 690 μμ with a maximum at about 600 μμ.

*Example 18.*—The dye 1,1'-diethyl-benzoseleno-5'-methyl-6'-ethoxybenzothio-mesoethyl-carbocyanine iodide corresponding with the formula—

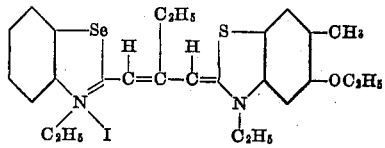

is obtained by boiling 6 grams of the intermediate product described in Example 16, 6 grams of 5-ethoxy-2,6-dimethylbenzothiazole ethiodide and 18 cc. of pyridine and working up the reaction mixture as described sub. (b) in Example 16. The dye may be purified by recrystallization from alcohol.

The alcoholic solution of the dye has an absorption maximum at a wave length of about 570 μμ.

Incorporated in a gelatino silver bromide emulsion containing about 4 per cent of silver iodide, the dye imparts to it a range of sensitiveness of about 505 μμ to 705 μμ with a maximum at about 655 μμ.

*Example 19.*—The dye 1,1'-diethyl-6-methoxybenzoseleno-5',6'-dimethylbenzothio-mesoethyl-carbocyanine perchlorate corresponding with the formula—

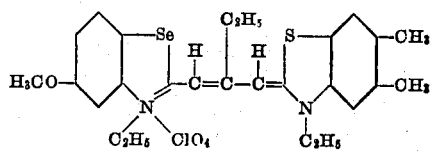

is obtained by boiling 10 grams of the intermediate product produced as described in Example 16, by starting from 2-methyl-5-methoxybenzoselenazole ethiodide 10 grams of 2,5,6-trimethylbenzothiazole ethiodide and 30 cc. of pyridine for about 1 hour to 130° C. The dye is precipitated from its solution in pyridine by the addition of 5 cc. of an aqueous solution of sodium perchlorate of 10 per cent strength. Recrystallization from alcohol yields bluish green felted crystals.

The alcoholic solution of the dye has an absorption maximum at a wave length of about 575 μμ.

Incorporated in a gelatino silver bromide emulsion containing about 4 per cent of silver iodide, the dye imparts to it a range of sensitiveness of about 500 μμ to 710 μμ with a maximum at about 665 μμ.

It is to be understood that our invention is not limited to the foregoing examples or to the specific details given therein. Numerous other embodiments are possible and we contemplate as included within our invention all such modifications and equivalents as fall within the scope of the appended claims. The nomenclature used is familiar to every chemist skilled in the art and has the advantage of clearness. Numbering of the thiazoles etc. is begun from the sulfur etc., numbering of the dyes is begun from the nitrogen atom. The formulae of the dyes as given herein represent the molecular structure of our new dyes so far as known. If however, in future it should become evident that the formulae do not exactly correspond to the dyes, this fact will not affect our invention since the dyes will be easily identified by the method of producing the same which has been fully described in the examples and is analogous to known methods.

What we claim is:

1. The dye 1,1'-diethyl-5,6-5'.6'-tetramethoxy-benzothiocarbocyanine iodide having an absorption maximum at a wave length of about 595 μμ.

2. The dye 1,1'-diethyl-5',6'-dimethylbenzothio-mesoethyl-carbocyanine iodide having an absorption maximum at a wave length of about 555 μμ.

3. The dye 1,1'-diethyl-6-methoxybenzoseleno-5',6' - dimethylbenzothio - mesoethyl - carbo - cyanine perchlorate.

4. A carbocyanine salt having two nuclei selected from the group consisting of benzthiazole nuclei and benzselenazole nuclei linked together in α-position to the nitrogen atom by a trimethenyl chain at least one of the nuclei containing substituents selected from the group consisting of alkyl, alkoxy, thioalkyl, aryl of the benzene series, dioxymethylene and dioxyethylene in the positions para to the carbon atoms common to at least one of the benzene rings and the heterocyclic ring fused on that benzene ring.

5. A carbocyanine salt having two nuclei selected from the group consisting of benzthiazole nuclei and benzselenazole nuclei linked together in α-position to the nitrogen atom by a trimethenyl chain at least one of the nuclei containing substituents selected from the group consisting of alkyl, alkoxy, thioalkyl, aryl of the benzene series, dioxymethylene and dioxyethylene in the positions para to the carbon atoms common to at least one of the benzene rings and the heterocyclic ring fused on that benzene ring, the central carbon atom of the trimethenyl chain being substituted by alkyl.

WALTER ZEH.
ADOLF SIEGLITZ.
MARTIN DABELOW.